United States Patent [19]

Yoshimura

[11] Patent Number: 4,784,922

[45] Date of Patent: Nov. 15, 1988

[54] CORROSION-RESISTANT CLAD STEEL AND METHOD FOR PRODUCING THE SAME

[75] Inventor: Tsuneo Yoshimura, Tokyo, Japan

[73] Assignee: Mitsubishi Steel Mfg. Co., Ltd., Tokyo, Japan

[21] Appl. No.: 914,915

[22] Filed: Oct. 3, 1986

[30] Foreign Application Priority Data

| Oct. 11, 1985 | [JP] | Japan | 60-224898 |
| Oct. 11, 1985 | [JP] | Japan | 60-224899 |
| Nov. 11, 1985 | [JP] | Japan | 60-250893 |
| Nov. 20, 1985 | [JP] | Japan | 60-258673 |
| Dec. 2, 1985 | [JP] | Japan | 60-269247 |

[51] Int. Cl.$^4$ .............................. B32B 15/18
[52] U.S. Cl. .................. 428/681; 148/11.5 Q; 148/12 B; 420/104; 420/121; 420/126; 420/127; 420/128; 428/685
[58] Field of Search ........... 148/11.5 Q, 12 B; 420/104, 121, 126, 127, 128; 428/659, 677, 683, 684, 685, 681

[56] References Cited

U.S. PATENT DOCUMENTS

| 2,037,733 | 4/1936 | Mudge | 148/11.5 Q |
| 3,810,793 | 5/1974 | Heller | 148/12 B |
| 4,242,150 | 12/1980 | Maxwell | 148/12 B |

FOREIGN PATENT DOCUMENTS

| 151281 | 8/1950 | Australia | 148/11.5 Q |
| 1627788 | 3/1971 | Fed. Rep. of Germany | 428/683 |
| 1921169 | 6/1971 | Fed. Rep. of Germany | 148/12 B |
| 34333 | 7/1982 | Japan | 148/12 B |
| 1124524 | 6/1986 | Japan | 148/12 B |
| 2077762 | 12/1981 | United Kingdom | 148/12 B |

Primary Examiner—Melvyn J. Andrews
Assistant Examiner—Robert L. McDowell
Attorney, Agent, or Firm—Flynn, Thiel, Boutell & Tanis

[57] ABSTRACT

The present invention provides corrosion resistance clad steels comprising a steel core and a cladding of a corrosion resistance metallic material tightly covering the circumference of the core, the interface between the core and cladding being metallurgically bonded. As the core materials, steel bars for concrete reinforcement including PC steel bars; or materials for sections (e.g., angles or channels) may be appropriately selected depending on the intended use. The foregoing steel materials is produced by a method comprising the steps of arranging the corrosion resistance metallic cladding member over the entire surface of the circumference of the steel core member and hot rolling to form an intimate metallurgical bonding at the interface between both members, thereby forming the foregoing clad steel material. The material may be formed into deformed steel bars. The clad steel thus obtained have an advantageous combination of properties, particularly with respect to corrosion and heat resistance, strength, bendability and are free of separation of the core and cladding.

16 Claims, 1 Drawing Sheet

CORROSION-RESISTANT CLAD STEEL AND METHOD FOR PRODUCING THE SAME

The present invention relates to a corrosion-resistant clad steel and a method of producing the same. More particularly, the present invention relates to high corrosion-resistance clad steel structural materials having a long useful life in corrosive service conditons, such as reinforcing steel bars for concrete structures, prestressed concrete (for example, used in ties of railroads) constructed on or near the sea or the similar salty corrosive environments; or steel sections (angles, channels, etc.) for chemical plants, etc., used under corrosive and high temperature conditions.

Heretofore, steels have been widely employed as reinforcements in concrete constructions, structural members for chemical plants or other various structural materials. However, known steels have the disadvantages that when they are employed in corrosive environments, such as in concrete buildings, ties of railroads, or other structures constructed on the sea or the seacoast; or in chemical plants exposed to corrosive and high-temperature environments, they are damaged due to corrosion and can not be used for a long period.

For example, steel bars have been widely used for concrete reinforcement.

Recently, corrosion problems or troubles caused due to invasion or penetration of salt have become increasinly serious in concrete buildings, railroads or other structures which have been constructed on the sea or at the seacoast and, thus, protection against such corrosive attack has been needed to obtain a long useful life. As means of protecting such reinforced concrete constructions from the corrosive attack of salt, the following methods have been proposed.

(1) Increasing the thickness of concrete as compared with usual concrete structures
(2) Covering the surface of concrete with corrosion-resistant materials
(3) Doping corrosion resisting materials into concrete
(4) Electroprotection
(5) Use of corrosion-resisting reinforcing steel bar Among those methods, particularly, the method (5) using corrosion-resisting reinforcing bars is considered advantageous over other methods, for example, in the following respects.

Maintenance cost, such as re-coating, is not required.
The thickness of concrete can be reduced, thereby making possible the weight saving.
The corrosion-resisting ability of the steel is effective against not only salt introduced externally but also salt contained originally therein.
Means of preventing corrosion attack is not required due to corrosion resistance ability of the reinforcing bar even when cracks occur in concrete.

As specific examples, there have been known (a) galvanized reinforcing steel bar, (b) resin-coated reinforcing steel bar and (c) corrosion resistant reinforcing steel bar. (d) As a further example, Japanese Utility Model Application Laid-Open No. 60-146 112 discloses a method in which the surface of a steel bar is covered with copper or zinc in a tubular configuration and then both members are tightly roll bonded; or a tape of copper or zinc is wound around a steel bar, welded and press-rolled to make a tight covering.

However, some problems have been encountered in such known methods. In the galvanized reinforcing steel bar (a), when the content of salt in concrete is increased over a certain level, the ZnO coating is disrupted and the steel is exposed, thereby leading to rust. As a further disadvantage, zinc plated on the steel is exhausted gradually by alkali contained in concrete and ultimately the plated coating will disappear.

The resin-coated reinforcing steel bar (b) is usually costly and great care should be taken for the quality control, particularly, with regard to coating material, thickness of the resin coating, hardness of the coating, etc. Further, the reinforcing bar of the resin-coated steel is disadvantageous in that wider cracks are caused in concrete members, the adhesion of the coated steel bar to concrete is small as compared to ordinary reinforcing steel bars and, fractures or cracks are apt to occur when they are bent with a small bending radius.

As the corrosion resistant reinforcing steel bar (c), Cu-W steel, high purity steels with very reduced contents of impurities, such as sulfur, and the high purity steel with an addition of Cu-W or Ni, etc., have been studied and tested. However, in tests under severe conditions, such as an exposure test on the sea, cracking occurred on the surface of concrete, although such corrosion resistant reinforcing bar were resistant to rust in comparison with normal steels. Also stainless steels are used as reinforcements for concrete because of their superior corrosion resistance to salty corrosive environments, but they are costly and, for example, in austenitic stainless steel, are insufficient in strength.

Further, the method (d) has problems in bending formability.

Further, the above corrosion problems caused due to salt attack have been also encountered in PC steel bars employed in ties of a coastal railroad and, as means of preventng the problems, stainless steel is considered as PC steel bars. While the PC steel bar of stainless steel exhibits a superior corrosion resistance in salty corrosive environments, it is costly and, as known from austenitic stainless steels, insufficient in strength.

Further, angles or channels employed as structural materials in chemical plants or other various structures exposed to corrosive or high temperature environments are gradually corroded as years go by and finally can no longer be used. As means of preventing such corrosion problems, corrosion resistant steel sections, such as angles or channels made of stainless steels, are considered to be useful. Although the stainless steel sections have superior corrosion-resistance and heat-resistance in severe corrosive and high-temperature environments, such as in chemical plants, they are expensive. Further, with respect to strength, for example, hot rolled stainless steel equal leg angles [Japanese Industrial Standard (JIS) G 4317] of austenitic stainless steel has at most a yield strength of the order of 20 to 35 kgf/mm$^2$ and thus cannot give a sufficient strength in applications where a strength level as high as the strength of the steel designated SS 55 (JIS G 3101) is required.

SUMMARY OF THE INVENTION

Therefore, it is an object of the present invention to eliminate the above disadvantages associated with the prior art steels and particularly to provide corrosion resistant clad steels adapted to the use in corrosive environments vulnerable to salt attack and further to a method thereof, the clad steel materials comprising a steel core and a corrosion resistant metallic cladding bonded onto the entire surface of the circumference of the core with a metallurgical bonding.

Another object of the present invention is to provide clad steel bars having superior properties, particularly with regrd to corrosion resistance, heat resistance, strength and bendability which especially make them useful in reinforced concrete buildings or other structures being constructed on the sea or at the seacoast.

A further object of the present invention is to provide corrosion resistant PC steel bars for prestressed concrete used, for example, in ties of a coastal railroad.

Still a further object of the present invention is to provide clad steel materials having a good corrosion resistance and a high heat resistance, thereby useful as sections, such as angles or channels, adapted to use in chemical plants or other structures exposed to corrosive or high temperature environments.

Also, the present invention is directed to a method of making the foregoing clad steel materials characterized by such advantageous properties.

According to the present invention, there are provided corrosion resistant clad steels, the clad steel comprising a core made of a steel material and a cladding made of a corrosion resistant metallic material and tightly covering the circumference of the core, the interface between the core and cladding is metallugically bonded. As the core materials, steel bars for concrete reinforcement including PC steel bars; or materials for sections (e.g., angles or channels), as specified in JIS, may be appropriately selected depending on the intended use. In addition to such steel materials, in certain applications, the core material may be made up of the composition consisting essentially of, by weight percentages, 0.10 to 0.50% carbon, 0.15 to 0.60% silicon, 0.20 to 3.00% manganese, 0.005 to 0.03% nitrogen and at least one ingredient selected from the group consisting of up to 0.30% vanadium, up to 0.20% niobium, up to 0.20% titanium and up to 0.005% boron and the balance consisting essentially of iron. In certain cases, the core composition may contain up to 0.5% chromium and up to 0.06% aluminum. The core is tightly covered with the corrosion resistant cladding in which the interface between the core and the cladding is metallurgically bonded. In such arranged structure, strength is ensured by the core member and, at the same, high corrosion resistance ability is imparted by the cladding member. When in addition to corrosion resistant, the clad steel material is required to be heat resistant, cladding materials having a heat resistance with corrosion resistance are employed, and therby making the clad steel material useful in high-temperature corrosive environments.

The foregoing steel material is produced by a method of the present invention, the method comprising the steps of arranging the corrosion resistant metallic cladding member over the entire surface of the circumference of the steel core member and hot rolling to form an intimate metallurgical bonding at the interface between both members, thereby forming the foregoing clad steel material. When the clad material is used as reinforcement for concrete constructions, it may be formed into a deformed steel bar in order to increase adhesion of concrete to the steel bar.

DETAILED DESCRIPTION OF THE PREFERRED EMBODIMENTS

Figure 1:
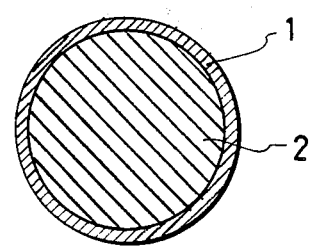
FIG. 1 is a sectional view of a reinforcing steel bar for concrete in accordance to one embodiment of the present invention.

The present invention will now be described in detail with reference to the accompanying drawings.

In one aspect, the invention resides in corrosion resistance and good bendability for clad steel bars for concrete reinforcement, the clad steel bars comprising a core of steel bar for concrete reinforcement and a cladding of a corrosion resistant metallic material covering the circumference of the core, the interface of the core and cladding being metallurgically bonded.

Generally, calcium hydroxide [$Ca(OH)_2$] formed by the reaction of calcium oxide (CaO) with water is present in reinforced concrete and establishes a high pH environment of about 12. In such a high pH condition, the surfaces of steel bars used in the concrete are covered with a film of $\gamma$-$Fe_2O_3$ and become a passive state, thereby corrosion no longer proceeds. However, when salt is present in the concrete, disruption of the passive layer is caused, thereby causing local corrosion to proceed in the reinforcing bars.

In such corrosive circumstances, corrosion-resistant metallic materials, such as stainless steel, are very effective to avoid the corrosion, but there are difficulties in forming them into steel bars for practical use by processing techniques heretofore practiced. Further, these materials are costly and unacceptable for usual use.

Under such situations, there can be obtained reinforcing steel bars having an outstanding corrosion resistance and, in other properties, well comparable to known reinforcing steel bars.

The core steel bar employed in the present invention may be selected appropriately from steel bars heretofore used for reinforced concrete, for example, SR 24 steel defined in JIS G 3112, depending on the required strength level. Also, the inventor has specially prepared a high strength core composition consisting essentially of, by weight percentages, 0.10 to 0.50% carbon, 0.15 to 0.60% silicon, 0.20 to 3.00% manganese, 0.005 to 0.03% nitrogen and at least one ingredient selected from the group consisting of up to 0.30% vanadium, up to 0.20% niobium, up to 0.20% titanium and up to 0.005% boron and the balance consisting essentially of iron. In certain cases, the core composition may further contain up to 0.5% chromium and up to 0.06% aluminum in addition to the foregoing composition. In these two types of the core steel bars, the reasons for the limitations of their compositions are described below.

C: C is essential to form carbides with V, Cr, etc., and thereby to increase strength. When the carbon content is less than 0.10%, a sufficient strength can not be obtained. On the other hand, an excess addition of more than 0.5% causes serious problems in elongation, toughness and weldability.

Si: Si has a deoxidizing effect and a matrix strengthening effect. A content of Si of less than 0.15% can not expect these effect, while even if Si is contained in an amount over 0.6%, these effect are saturated and toughness will be impaired.

Mn: Mn has an effect on desulfurization and is essential to obtain an improvement in strength. An insufficient amount of less than 0.20% results in the lack of strength in the limited range of carbon. On the other hand, an excess amount exceeding 3.00% can not provide any further advantage in this effect, because the effect has been saturated.

V: V is added to precipitate carbides and nitrides in the matrix when transformation from austenite to ferrite+pearlite takes place during cooling the steel bars, and thereby strengthen the matrix. An excess addition of 0.3% is commercially disadvantageous because the strengthening effect is saturated.

Nb, Ti: Both of these components are necessary to precipitation hardening. They form fine precipitates of their carbides and nitrides and thereby strengthen the matrix. Since even if each of them is added in amounts exceeding 0.2%, the effect is saturated, the addition is limited to 0.2% or less from the viewpoint of cost.

B: B reduces the amounts of alloying elements used in the steel and has a strengthening effect. However, an excess addition not only has no further effect in strengthening because the effect is saturated, but also causes a reduction of toughness. Therefore, the maximum amount of B is limited to 0.005%.

N: N is needed to form precipitates of carbides and nitrides by bonding with C, V, Nb and Ti and thereby strengthen the steel. When the content is less than 0.005%, the amount of the precipitates is insufficient. On the other hand, addition exceeding 0.03% leads to deleterious effects, such as a reduction of toughness.

Cr: Cr, like Mn, has a strengthening effect but an excess addition of more than 0.5% is unfavorable from the economical viewpoint.

Al: Al has a deoxidizing effect and is effective as a precipitation hardening element. However, the upper limit of Al is limited to 0.06%, since the effect has been saturated even if Al is added in an amount eceeding 0.06%.

Further, the cladding material may be appropriately selected from corrosion resistant metallic materials, such as the foregoing stainless steels, steels and non-ferrous metallic materials. The examples of the cladding metallic materials include stainless steels as referred to as SUS 304, 403 and 430. In certain applications, the steel bars are required to have heat resistance in addition to corrosion resistance and then a heat-resisting, corrosion resisting material should be employed.

The reinforcing bar according to the present invention may be formed into a deformed reinforcing bar or into a hollow bar by boring a hole in the central portion of the bar for the purpose of weight saving.

In order to make the foregoing concrete reinforcing steel bars, a cladding made of a corrosion-resistant metallic material is arranged in such a manner that the cladding covers the entire surface of the circumference of a core made of a round or square steel bar for concrete reinforcement and the assembly such arranged is hot-roll bonded to form a metallurgical bond at the interface between them, thereby providing a clad steel bar.

In one method for covering the entire surface of the circumference of the core steel bar with the cladding of the corrosion resistant metallic material, a hoop of the cladding metallic material is cut in according to the circumferential length of the core steel bar. The thus cut hoop is wound around the core steel bar by a roll forming machine or press machine and the opposite marginal edge portions of the hoop are tightly bonded, for example, by butt-welding.

As an alternate method, a cladding material is in advance formed into a tubular form and assembled over the outer periphery of the core to form a composite steel bar. In order to form a tight metallurgical bond, the core and cladding are hot rolled together by a roll mill which is adjusted at an optimum temperature, depending on the materials of the core and the cladding.

When the core is made of the core composition consisting essentially of, by weight percentages, 0.10 to 0.50% carbon, 0.15 to 0.60% silicon, 0.20 to 3.00% manganese, 0.005 to 0.03% nitrogen, at least one ingredient selected from the group consisting of up to 0.30% vanadium, up to 0.20% niobium, up to 0.20% titanium and up to 0.005% boron and the balance consisting essentially of iron and further optionally, up to 0.5% chromium and up to 0.60% aluminum, the core and the cladding are hot rolled at a temperature of 900° to 1250° C. and then cooled to 500° C. at a cooling rate of 0.2° C./sec. or more. The reason for this hot-rolling temperature of 900° to 1250° C. is that at temperatures lower than 900° C., vanadium can not fully be dissolved as a solute component in the matrix to provide a solid solution in the course of hot rolling, thereby resulting in the lack of strength and the lowering of formability. On the other hand, an excessive heating at temperatures higher than 1250° C. causes an unfavorable grain growth, thereby impairing toughness. The rate of cooling after the hot rolling may take a role in the state of precipitation of vanadium-containing carbide or vanadium-containing nitride and the hardness of the matrix, thereby affecting mechanical properties of the resulting steel bars. It has been found that an increased strength can be obtained by the foregoing cooling to 500° C. at the cooling rate of at least 0.2° C./sec.

Also, it is possible to impart the surface of the composite reinforcing bar with a desired deformed configuration by using a deforming press roll at the finishing stage of the hot rolling operation.

In particular aspect of the concrete reinforcing bar set forth above, corrosion resistant PC steel bars are made in the same way as set forth above employing known PC steel bars as the core. Examples of core material for PC steel bar include PC steel bar specified as SBPR 80/95 in JIS. Also, the clad PC steel bars may be obtained as a deformed reinforcing bar as set forth.

FIG. 1 shows a cross sectional view of a concrete reinforcing bar in which reference numerals 1 and 2 represent a cladding and a core, respectively.

Figure 2:
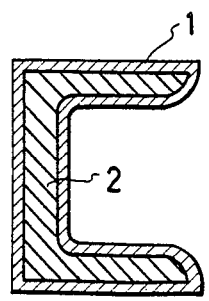
FIG. 2 is a sectional view of a channel in accordance to an alternate embodiment of the present invention.
Figure 3:
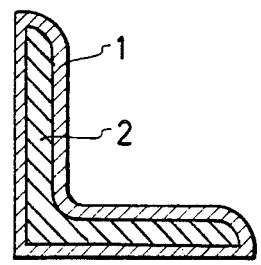
FIG. 3 is a sectional view of an angle in accordance to a further embodiment of the present invention.

Further, in a further embodiment of the present invention, corrosion resistant clad steel sections are obtained in which steel materials for steel sections, such as SS 41 specified in JIS, may be employed as a core material in the foregoing process. As a cladding material, the same materials set forth above can also employed. In one aspect, before the cladding operation, a cladding material is, as previously set forth, formed into a hoop and cut into the length corresponding to the length of the circumference of a core material with a round or square cross section and, thereafter, is hot-rolled to form a metallurgical bond at the interface between the core and cladding materials, providing clad sections. FIG. 2 and FIG. 3 show cross sectional views of a channel and an angle, respectively. In these drawings reference numerals 1 and 2 represent a cladding and a core, respectively.

In making of the clad steel sections, the foregoing high strength core composition, which is not specified in JIS, can be also employed as the core material and the same hot rolling operation set forth above in detail for the core composition can be practiced.

The examples of the present invention will now be described in detail hereinbelow.

EXAMPLE 1

SR 24 steel was melted in an electric furnace and cast to a round billet with a diameter of 60 mm by a continuous casting process. After the billet was cooled, it was subjected to descaling operation by shot blasting and cut into a length of 1.2 m to provide a core material.

A hoop of SUS 304 stainless steel with a thickness of 1.65 mm and a width of 1.2 m was cut into a length corresponding to the circumference of the core billet and was bonded as a cladding onto the entire circumferential surface of the core using a roll forming machine so as to envelope the core within it. The opposite marginal edge portions of the hoop were butt welded to form into a tubular like covering. At both ends of the material thus assembled, the interface between the core and the cladding was also welded without gaps in order to avoid the invasion of air.

The composite material thus obtained was heated to 1200° C. in a furnace, hot-rolled into a round bar with a diameter of 21 mm by a hot-rolling machine and cooled to provide a clad steel reinforcing bar of the present invention, as illustrated in FIG. 1.

The resultant steel bar, as shown in FIG. 1, comprises a core 2 and a cladding 1 having a thickness of 0.6 mm enveloping the core 2 therein.

The reinforcing clad steel bar was subjected to a bending test in which the steel bar was bent with a bending diameter of three times the diameter of the steel bar. Even at a bending angle of 180 degrees, cracks, separation of the cladding 1 from the core 2 or other defects were not detected and it was found that a metallugical bond was formed at the interface between both members. Further, when a reinforced concrete was produced using this reinforcing clad steel bar and examined on its salt-resistance or other properties, superior results were obtained.

EXAMPLE 2

Further reinforcing clad steel bars B thorough I were made in the same procedure as described in Example 1 except that the core material, SR 24, employed in Example 1 was replaced with core materials given in B to H in Table 1 below and cooling after hot rolling was performed at a cooling rate of 0.2° C./sec or more by air cooling. The resultant clad steel bars were examined on their mechanicakl properties. The results are shown in Table 2 and, as can be seen from the results, the steel clad bars using the core compositions B to I of the present invention have been found to have a yield strength increase of about 40% or more as compared to stainless steel bar A.

TABLE 2

| | Mechanical Properties | | | |
|---|---|---|---|---|
| | 0.2% Yield Strength kgf/mm$^2$ | Tensile Strength kgf/mm$^2$ | Elongation % | Reduction of Area % |
| A | 26.7 | 58.2 | 56.1 | 72.2 |
| B | 45.0 | 62.5 | 30 | 65 |
| C | 53.0 | 67.6 | 26 | 54 |
| D | 77.2 | 90.1 | 24 | 50 |
| E | 39.6 | 57.4 | 33 | 69 |
| F | 47.6 | 65.0 | 31 | 64 |
| G | 40.2 | 58.1 | 33 | 66 |
| H | 72.4 | 101 | 21 | 49 |
| I | 50.5 | 71.4 | 29 | 63 |

A: Reference Steel Bar,
B to I: Steel Bars of the Present Invention
Cooling after Hot Rolling: Air Cooling

EXAMPLE 3

A PC steel bar was made in the same procedure as described in Example 1 except that the core material, SR 24, employed in Example 1 was replaced with a core materials of SBPR 80/95. Prestressed concrete was produced and examined on its salt resistance and other properties. There was obtained satisfactory results.

FIG. 2 and FIG. 3 show the cross sectional views of a channel (FIG. 2) and an angle (FIG. 3), comprising a core 2 and a cladding 1 of heat and corrosion resistant metallic material covering the core 1 and, in the following Examples 4 and 5, angles were made by the following procedure.

EXAMPLE 4

SS 41 steel was melted in an electric furnace and cast into a square billet with a cross section of 90 mm×90 mm by a continuous casting process. After the billet was closed, it was subjected to descaling operation by shot blasting and cut into a length of 1.2 m to provide a core.

A hoop of SUS 304 stainless steel with a thickness of 2.0 mm and a width of 1.2 m were cut into a length corresponding to the circumference of the core billet and was bonded as a cladding onto the entire surface of the circumference of the core using a roll forming machune so as to envelope the core within it. The opposite marginal edge portions of the hoop were butt welded to form into a tubular like covering. At both ends of the assembled material, the interface between the core and the cladding were also welded without gaps in order to avoid the invasion of air.

The composite material thus obtained was heated to 1200° C. in a furnace, formed into an angle as shown in FIG. 3 by a hot-rolling machine and cooled to provide

TABLE 1

| | Chemical Composition wt % | | | | | | | | | | | | |
|---|---|---|---|---|---|---|---|---|---|---|---|---|---|
| | C | Si | Mn | P | S | Ni | Cr | Mo | Al | V | Nb | Ti | B | N |
| A | 0.06 | 0.66 | 1.00 | 0.028 | 0.005 | 8.25 | 18.10 | — | — | — | — | — | — | — |
| B | 0.18 | 0.24 | 0.71 | 0.025 | 0.024 | — | — | 0.03 | 0.027 | 0.10 | — | — | — | 0.012 |
| C | 0.14 | 0.19 | 0.28 | 0.023 | 0.021 | — | — | 0.02 | — | 0.23 | — | 0.015 | 0.0020 | 0.009 |
| D | 0.37 | 0.23 | 2.31 | 0.021 | 0.022 | — | — | 0.02 | 0.018 | — | — | — | — | 0.011 |
| E | 0.17 | 0.20 | 0.63 | 0.022 | 0.018 | — | 0.43 | 0.01 | 0.019 | 0.13 | — | — | — | 0.010 |
| F | 0.21 | 0.53 | 0.83 | 0.023 | 0.024 | — | — | 0.03 | 0.010 | 0.09 | — | — | — | 0.015 |
| G | 0.20 | 0.23 | 0.85 | 0.025 | 0.020 | — | 0.20 | 0.02 | 0.043 | — | 0.08 | — | — | 0.013 |
| H | 0.40 | 0.31 | 1.60 | 0.022 | 0.034 | — | 0.25 | 0.02 | 0.030 | 0.11 | — | — | — | 0.016 |
| I | 0.27 | 0.27 | 1.49 | 0.015 | 0.021 | — | 0.34 | 0.04 | 0.043 | 0.08 | — | 0.013 | — | 0.020 |

A: Reference Steel Bar,
B to I: Steel Bars of the Present Invention a clad angle having the cladding layer with a thickness of about 0.4 mm.

The resultant angle was examined on its properties and superior results were obtained.

EXAMPLE 5

Further clad steel angles B through I comprising a core 2 having the compositions given in the foregoing Table 1 and a cladding 1 of heat and corrosion resistant metallic materials of SUS 304 steel enveloping the core 2 therein were prepared by the following procedure.

Each core material was melted in an electric furnace and cast into a square billet with a cross section of 90 mm×90 mm by a continuous casting process. After the billet was cooled, it was subjected to descaling operation by shot blasting and cut into a length of 1.2 m to provide a core.

A hoop of SUS 304 stainless steel with a thickness of 2.00 mm and a width of 1.2 m was cut into a length corresponding to the circumference of the core billet and was bonded as a cladding onto the entire surface of the circumference of the core using a roll forming machine so as to envelope the core within it. The opposite marginal edge portions of the hoop were butt welded to form into a tubular like covering. At both ends of the assembled material, the interface between the core and the cladding was also welded without gaps in order to avoid the invasion of air.

The composition material thus obtained was heated to 1200° C. in a furnace, formed into an angle as shown in FIG. 3 by a hot-rolling machine and cooled at a cooling rate of not less than 0.2° C./sec by air-cooling to provide a clad angle having the cladding layer with a thickness of about 0.1 mm.

Table 3 show the mechanical properties of the resultant angles and, as can be seen from the results, the steel angles using the core compositions B to I of the present invention were found to have a yield strength increase of about 50% or more as compared with a stainless steel bar A.

TABLE 3

| | Mechanical Properties | | | |
| --- | --- | --- | --- | --- |
| | 0.2% Yield Strength kgf/mm² | Tensile Strength kgf/mm² | Elongation % | Reduction of Area % |
| A | 27.6 | 59.3 | 55.1 | 72.1 |
| B | 47.3 | 65.8 | 31 | 66 |
| C | 55.8 | 71.2 | 27 | 53 |
| D | 81.3 | 95 | 23 | 48 |
| E | 41.7 | 60.3 | 32 | 68 |
| F | 49.2 | 68.3 | 30 | 65 |
| G | 42.3 | 61.8 | 32 | 68 |
| H | 76 | 106 | 22 | 50 |
| I | 53.2 | 75.2 | 28 | 61 |

A: Reference Steel Bar,
B to I: Steel Bars of the Present Invention
Cooling after Hot Rolling: Air Cooling As set forth above, the present invention provides clad steel material, such reinforcing bars, PC steel bars and steel sections, in which their strength is ensured by the core material and corrosion resistance or further heat resistance is imparted by the cladding, thereby corrosion and heat resistance are greatly improved while maintaining advantageous properties of the prior art steels, particularly with regard to strength.

Further, according to the present invention, there can be readily produced such improved steels. For certain applications, hollow steel product or deformed products may be obtained and weight saving and higher adhesion of the clad steels to concrete can be attained. Further, since the interface between the core and cladding is metallurgically bonded, there is no risk of separation of the two members and can be successfully processed into desired forms.

What is claimed is:

1. A corrosion resistant, high strength clad steel comprising a core made of a steel bar and a cladding made of a corrosion resistant metallic material and tightly covering the circumference of said core, the interface between said core and said cladding being metallurgically bonded, wherein said core is made of a composition consisting essentially of, by weight percentages, 0.10 to 0.50% carbon, 0.15 to 0.60% silicon, 0.20 to 3.00% manganese, 0.005 to 0.03% nitrogen and at least one ingredient selected from the group consisting of up to 0.30% vanadium, up to 0.20% niobium, up to 0.20% titanium and up to 0.005% boron and the balance consisting essentially of iron.

2. A corrosion resistant high strength clad steel as claimed in claim 1, wherein said composition of said core further contains up to 0.5% chromium and up to 0.06% aluminum.

3. A corrosion resistant, high strength clad steel comprising a core made of a steel section and a cladding made of a corrosion resistant metallic material and tightly covering the circumference of said core, the interface between said core and said cladding being metallurgically bonded, wherein said core is made of a composition consisting essentially of, by weight percentages, 0.10 to 0.50% carbon, 0.15 to 0.60% silicon, 0.20 to 3.00% manganese, 0.005 to 0.03% nitrogen and at least one ingredient selected from the group consisting of up to 0.30% vanadium, up to 0.20% niobium, up to 0.20% titanium and up to 0.005% boron and the balance consisting essentially or iron.

4. A corrosion resistant high strength clad steel as claimed in claim 3, wherein said composition of said core further contains up to 0.5% chromium and up to 0.06% aluminum.

5. A method for producing a corrosion resistant clad steel comprising a core made of a steel bar and a cladding made of a corrosion resistant metallic material and tightly covering the circumference of said core, said method comprising the steps of arranging said cladding over the entire surface of the circumference of said core and hot rolling to form an intimate metallurgical bonding at the interface between said core and said cladding, thereby forming said clad steel, wherein said core is made of a composition consisting essentially of, by weight percentages, 0.10 to 0.50% carbon, 0.15 to 0.60% silicon, 0.20 to 3.00% manganese, 0.005 to 0.03% nitrogen and at least one ingredient selected from the group consisting of up to 0.30% vanadium, up to 0.20% niobium, up to 0.20% titanium and up to 0.005% boron and the balance consisting essentially of iron.

6. A method as claimed in claim 5, wherein said composition of said core further contains up to 0.5% chromium and up to 0.06% aluminum.

7. A method as claimed in claim 6, wherein said clad steel is formed to a deformed steel bar by hot rolling.

8. A method as claimed in claim 6, wherein said core and said cladding are hot rolled at a temperature of 900° to 1250° C. and then cooled to 500° C. at a cooling rate of 0.2° C./sec. or more.

9. A method as claimed in claim 8, wherein said clad steel is formed to a deformed steel bar by hot rolling.

10. A method as claimed in claim 5, wherein said core and said cladding are hot rolled at a temperature of 900° to 1250° C. and then cooled to 500° C. at a cooling rate of 0.2° C./sec. or more.

11. A method as claimed in claim 10, wherein said clad steel is formed to a deformed steel bar by hot rolling.

12. A method as claimed in claim 5, wherein said clad steel is formed to a deformed steel bar by hot rolling.

13. A method for producing a corrosion resistant clad steel comprising a core made of a steel section and a cladding made of a corrosion resistant metallic material and tightly covering the circumference of said core, said method comprising the steps of arranging said cladding over the entire surface of the circumference of said core and hot rolling to form an intimate metallurgical bonding at the interface between said core and said cladding, thereby forming said clad steel, wherein said core is made of a composition consisting essentially of, by weight percentages, 0.10 to 0.50% carbon, 0.15 to 0.60% silicon, 0.20 to 3.00% manganese, 0.005 to 0.03% nitrogen and at least one ingredient selected from the group consisting of up to 0.30% vanadium, up to 0.20% niobium, up to 0.20% titanium and up to 0.005% boron and the balance consisting essentially of iron.

14. A method as claimed in claim 13, wherein said core and said cladding are hot rolled at a temperature of 900° to 1250° C. and then cooled to 500° C. at a cooling rate of 0.2° C./sec. or more.

15. A method as claimed in claim 13, wherein said composition of said core further contains up to 0.5% chromium and up to 0.06% aluminum.

16. A method as claimed in claim 15, wherein said core and said cladding are hot rolled at a temperature of 900° to 1250° C. and then cooled to 500° C. at a cooling rate of 0.2° C./sec. or more.

* * * * *

UNITED STATES PATENT AND TRADEMARK OFFICE
CERTIFICATE OF CORRECTION

PATENT NO. : 4 784 922
DATED : November 15, 1988
INVENTOR(S) : Tsuneo YOSHIMURA

It is certified that error appears in the above-identified patent and that said Letters Patent is hereby corrected as shown below:

Column 10, line 37; change "or" to ---of---.

Signed and Sealed this

Twentieth Day of June, 1989

Attest:

DONALD J. QUIGG

*Attesting Officer*  *Commissioner of Patents and Trademarks*